Jan. 13, 1948. J. MULLER 2,434,428
SELF-CLOSING FILLING NOZZLE
Filed May 27, 1939
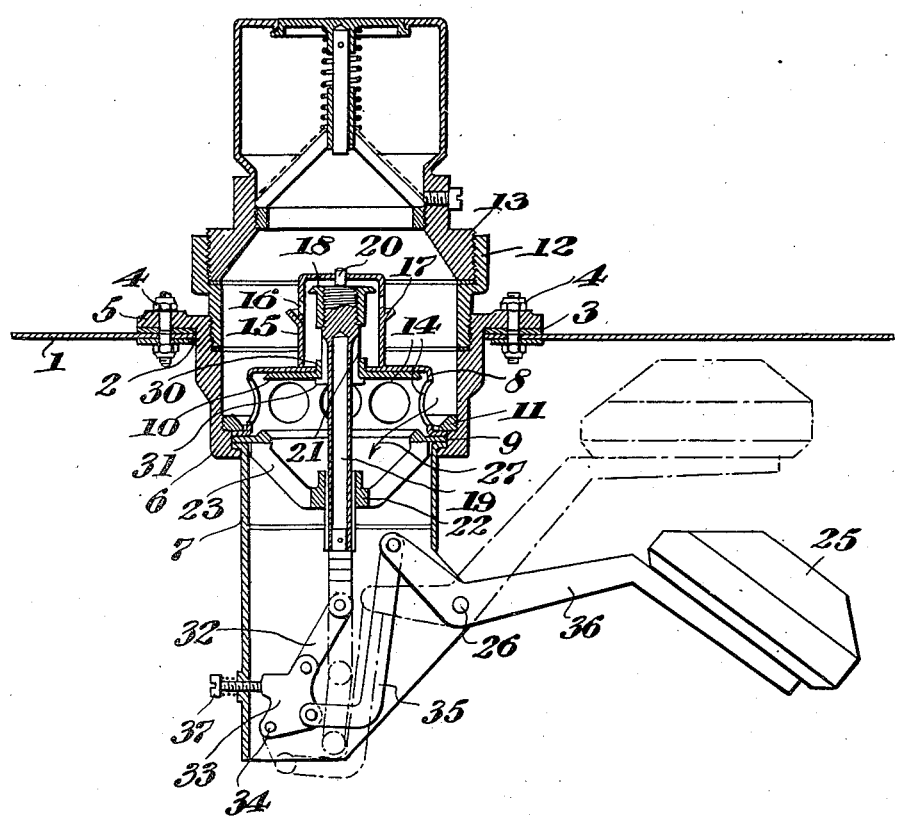
Inventor,
Jacques Muller
By Young, Emery + Thompson
Attys.

Patented Jan. 13, 1948

2,434,428

UNITED STATES PATENT OFFICE 2,434,428

SELF-CLOSING FILLING NOZZLE

Jacques Muller, La Garenne-Colombes, France

Application May 27, 1939, Serial No. 276,206
In France June 9, 1938

Section 3, Public Law 690, August 8, 1946
Patent expires June 9, 1958

7 Claims. (Cl. 137—104)

This invention relates to float-controlled filling nozzles, that is to say a nozzle which contains a valve operated by a float to cut off the flow when the tank which is being supplied by the nozzle is filled.

When filling is rapid, as it is required to be in, for instance, the supply of aeroplane tanks, it is important that the valve should not normally be subjected to the drag of the liquid, but should be sheltered from it until the time comes for closing when the desired level is reached in the tank.

But since considerable pressure is a necessary concomitant of rapid flow, a large force is necessary to move the valve from its sheltered position against the liquid pressure; while considerations of space limit both the size of the float and the lever arm on which it acts.

Moreover, when the time comes for closing the valve it is not desirable that it should be slammed upon its seat by the full force of the flowing stream behind it, for the resulting hydraulic ram action would impose on the piping such a strain as it could not withstand without by-passes or like means for reducing the shock.

The method of the present invention enables both these difficulties to be overcome. It consists in using the movement of the float to make the stream of liquid operative upon an auxiliary drag, and using the pull of the liquid on this drag to bring about the closing of the main valve, for example by assisting the float to move the main valve from a sheltered position into the stream of liquid so that the force of the liquid becomes effective to close it. Initially the stream of liquid must not be operative upon the drag, which is readily arranged either by sheltering the drag from the stream when in its initial position, or by positively supporting it against the pull of the liquid until the time comes for it to operate.

A further important feature of the invention is a method of braking the movement of the main valve to avoid harmful shock. It consists in utilising the initial movement of the drag to close the outflow of that part of the stream flowing past it, the drag thereafter serving as a brake or dash-pot.

The invention includes also apparatus by which the method may be carried out. Within the filling nozzle the drag is normally sheltered from the stream of liquid, or supported against its force, or both, but it is connected to the float and the stream of liquid is made operative upon it by the float when the tank being supplied is nearly full. It is also connected with the main valve whereby its movement under the force of the liquid brings about the closing of the valve, for example by assisting the float to shift the valve from a sheltered position into the stream of liquid. To increase the effectiveness of the drag it is placed within a chamber which communicates by two ports at successive points with the stream of liquid through the nozzle, so that a portion of the stream flows through the chamber. Initially the drag is sheltered in the closed end of the chamber on the side of the inflow port remote from the outflow port, and the float as it rises shifts it to a position in which it obstructs the flow between the ports, as it will most effectively do if it substantially fills the cross-section of the chamber between the ports, that is to say fits like a piston in the chamber. If then the movement of the drag after it has initiated the closing of the main valve, is caused substantially to close the outflow port of the chamber, it will act as a dash-pot permitting the main valve to approach its seat only so fast as the liquid confined in the chamber by the drag can leak out past the drag or otherwise.

The convenient arrangement is to mount the drag and the main valve upon a common stem upon which the valve has limited lost motion. The rising float has at first only to move the drag, overcoming the pressure of the liquid which tends to keep the drag in its sheltered position. When brought into the stream the drag can move freely under the force of the liquid until the lost motion between its stem and the main valve is taken up. It then, aided by the float, shifts the main valve into the stream, whereupon the main valve can move freely to the extent of the lost motion, after which it must carry the drag with it. As the drag at once closes the outflow port of its chamber the further movement of the valve is made as gentle as desired.

Other features of the invention may more conveniently be explained with reference to the example of a filling nozzle embodying it shown in axial section in the single figure of the accompanying drawing.

In this drawing 1 is the wall of a tank to be filled, through an opening 2 to which a member 5 is secured by bolts 4, a liquid-tight joint being made by the washer 3. At its lower end the member 5 has an inturned lip 6 on which rest the flange of a tube 7 and the flange of a cap 8, the rim of the seat 9 of the main valve 10 being gripped between these flanges under the pressure of the threaded ring 11 which screws into the member 5.

The upper end of the member 5 is threaded to receive a ring 12 into which screws a mouthpiece designed to receive the attachment of the filling hose, not shown.

The cap 8 shelters the valve 10 when the latter is in the position shown in the drawing, the liquid passing beneath the valve through lateral openings 14 in the cap. Above the cap is a chamber 15 with small openings 16 above a surrounding basin 17. The chamber 15 contains, and its closed end may shelter, a drag in the form of a disc 18 screwed upon an externally grooved member 31 integral with the spindle 19. The sleeve 30 forming the boss of the valve 10 can slide upon the member 31 between its bottom flange and the end of the boss of the drag 18. In the otherwise closed end of the chamber is a port normally sealed by a stud 20 projecting from the drag 18. The external grooves 21 in the member 31 connect the chamber 15 with the interior of the cap 8 beneath the valve 10 and form an outflow port for the liquid which enters the chamber through the inflow ports 16.

The stem 19 is further guided by the central boss 22 of a spider 23 integral with the valve seat 9. The lower end of the stem is connected by a link 32 with a second link 33 pivoted on the tube 7 at 34. An intermediate point in this second link 33 is connected by the elbow link 35 to the end of an arm 36 pivoted at 26 upon the tube 7 and carrying the float 25. An adjustable screw 37 having a spring surrounding it between its head and the tube 7 forms an abutment for the link 33. The two links 32, 33 form a toggle, and the screw 37 should be set to allow the toggle just to pass its dead point when the float 25 falls.

The action of the apparatus is as follows: during filling the parts are in the position shown in full lines in the drawing, liquid flowing freely through the openings 14 of the cap 8 as indicated by the arrow 27 and also through the ports 16 and 21 and the chamber 15. The weight of the parts on the stem 19 is not upborne by the counter-balancing weight of the float, but by the pivot 34 and the abutment screw 37 which also will resist the force of the stream upon the drag 18 if it is not (as shown) sheltered by the closed end of the chamber. As the tank 1 becomes nearly filled, the liquid lifts the float 25 rocking the toggle 32, 33 to the right, and pulling down the drag 18 until the stud 20 no longer plugs the port in the end of the chamber 15. The pressure of the liquid entering through this port is then set off against the pressure of the liquid on the under side of the drag 18; and a little later the drag comes into the stream entering through the ports 16. The end of the boss of the drag 18 then encounters the end of the sleeve 30 of valve 10, and aided by the further lift of the float 25 is able to shift the valve 10 from its sheltered position notwithstanding the pressure of the liquid on its under side. The valve is then brought past the top of the openings 14 and comes into the stream indicated by the arrow 27 and the stream then tends to carry it quickly down to its seat 9.

The valve can move freely however only until it again abuts on the flange of the member 31. Meanwhile the drag 18 has passed the ports 16 but the liquid confined beneath it can escape through the ports 21. When however the boss of the drag fills the opening in the cap 8 a certain amount of liquid is captive in the chamber 15 beneath the drag 18 and can only escape by leakage past the drag or between it and the sleeve 30. The final movement of the valve is therefore checked and it comes down upon its seat 9 gently.

It will be understood that the invention is applicable to other types of self-closing filling nozzles than that shown, and the details of construction must vary accordingly to the type of nozzle.

I claim:

1. A float-controlled filling nozzle including a valve for shutting off the flow through the nozzle, a float adapted to be lifted by the liquid in a tank to be filled, an auxiliary drag, means normally preventing said drag from being shifted by the stream of liquid, means actuated by the lifting of said float for making the stream operative upon said drag, and means connecting said drag with said valve whereby the movement of said drag under the force of the liquid shifts the valve into the said stream of liquid.

2. A float-controlled filling nozzle including a valve for shutting off the flow through the nozzle, a float adapted to be lifted by the liquid in a tank to be filled, a chamber in the nozzle closed at one end and communicating by inflow and outflow ports at successive points with the stream of the liquid through the nozzle, an auxiliary drag contained within said chamber and normally resting in the closed end, the chamber on the side of the inflow port remote from the outflow port, means connecting said drag with said float whereby lifting of the float brings said drag into a position in which it obstructs the flow between the ports, and means connecting said drag with said valve whereby the movement of said drag under the force of the liquid shifts the valve into the said stream of liquid.

3. A float-controlled filling nozzle including a valve for shutting off the flow through the nozzle, means for sheltering said valve when fully open from the stream of liquid through the nozzle, a float adapted to be lifted by the liquid in a tank to be filled, a chamber in the nozzle closed at one end and communicating by inflow and outflow ports at successive points with the stream of liquid through the nozzle, an auxiliary drag contained within said chamber, means normally preventing said drag from being shifted by the stream of liquid, means connecting said drag with said float whereby lifting of the float brings said drag into a position in which it obstructs the flow between the ports, and means connecting said drag to the valve whereby the valve is shifted into the stream by the movement of the drag under the force of the liquid upon it.

4. A float-controlled filling nozzle including a valve for shutting off the flow through the nozzle, a float adapted to be lifted by the liquid in a tank to be filled, a chamber in the nozzle closed at one end and communicating by inflow and outflow ports at successive points with the stream of liquid through the nozzle, an auxiliary drag contained within said chamber and substantially filling its cross-section and normally resting in it on the side of the inflow port remote from the outflow port, means connecting said drag with said float whereby lifting of the float brings said drag into a position in which it obstructs the flow between the ports, means connecting said drag with said valve so as by its movement under the force of the liquid to bring about the closing of the valve, and means actuated by the movement of said drag for closing the outlet port whereupon the drag acts as a brake.

5. A float controlled filling nozzle including a valve for shutting off the flow through the nozzle, a float adapted to be lifted by the liquid in a tank to be filled, a chamber in the nozzle closed at one end save for a relief port and communicating by inflow and outflow ports at successive points with the stream of liquid, through the nozzle, an auxiliary drag contained within said chamber and normally resting in the closed end of the chamber on the side of the inflow port remote from the outflow port and closing said relief port, means connecting said drag with said float whereby lifting of the float brings said drag into a position in which it first opens said relief port, and then obstructs the flow between the ports, and means connecting said drag with said valve so as by its movement under the force of liquid to bring about the closing of the valve.

6. A float-controlled filling nozzle including a valve for shutting off the flow through the nozzle, a float adapted to be lifted by the liquid in a tank to be filled, an auxiliary drag co-axial with said valve, said valve and drag having a common stem and limited lost motion relatively to each other, and means actuated by the lifting of said float for actuating said common stem for making the stream operative upon said drag to move it to take up the lost motion and shift the valve.

7. A float-controlled filling nozzle including a valve for shutting off the flow through the nozzle, a float adapted to be lifted by the liquid in a tank to be filled, an auxiliary drag, means including a toggle linkage connecting said float to said drag, said toggle linkage passing its dead centre when the float falls so that until the float rises the force of the liquid upon said drag is not communicated to the float, and means connecting said drag with said valve so as by its movement under the force of the liquid to bring about the closing of the valve.

JACQUES MULLER.

REFERENCES CITED

The following references are of record in the file of this patent:

UNITED STATES PATENTS

| Number | Name | Date |
|---|---|---|
| 1,217,183 | Jackson | Feb. 27, 1917 |

FOREIGN PATENTS

| Number | Country | Date |
|---|---|---|
| 302,933 | Great Britain | May 30, 1929 |